(12) United States Patent
Caviedes

(10) Patent No.: US 8,457,193 B2
(45) Date of Patent: Jun. 4, 2013

(54) NO-REFERENCE VIDEO QUALITY MODEL

(75) Inventor: Jorge E. Caviedes, Mesa, AZ (US)

(73) Assignee: Intel Corporation, Santa Clara, CA (US)

( * ) Notice: Subject to any disclaimer, the term of this patent is extended or adjusted under 35 U.S.C. 154(b) by 1335 days.

(21) Appl. No.: 11/906,101

(22) Filed: Sep. 28, 2007

(65) Prior Publication Data

US 2009/0085914 A1 Apr. 2, 2009

(51) Int. Cl.
*H04N 7/50* (2006.01)
(52) U.S. Cl.
USPC .................................. 375/240.01; 370/252
(58) Field of Classification Search
USPC ............ 370/252; 375/240.01, 240.26, 240.29
See application file for complete search history.

(56) References Cited

U.S. PATENT DOCUMENTS

| | | | | |
|---|---|---|---|---|
| 5,327,257 A * | 7/1994 | Hrytzak et al. | ............... | 358/447 |
| 6,285,797 B1 * | 9/2001 | Lubin et al. | .................... | 382/254 |
| 6,822,675 B2 * | 11/2004 | Jung et al. | ..................... | 348/180 |
| 6,876,381 B2 * | 4/2005 | Van Zon | ....................... | 348/180 |
| 6,888,564 B2 * | 5/2005 | Caviedes et al. | .............. | 348/180 |
| 7,003,170 B1 * | 2/2006 | Martucci et al. | .............. | 382/250 |
| 7,038,710 B2 * | 5/2006 | Caviedes | ..................... | 348/180 |
| 7,079,704 B2 * | 7/2006 | Caviedes | ..................... | 382/280 |
| 7,460,178 B2 * | 12/2008 | Kondo et al. | ................. | 348/576 |
| 2002/0071614 A1 * | 6/2002 | Ali et al. | ...................... | 382/278 |

* cited by examiner

*Primary Examiner* — Ricky Ngo
*Assistant Examiner* — Christine Ng
(74) *Attorney, Agent, or Firm* — Caven & Aghevli LLC

(57) ABSTRACT

Methods and apparatus relating to video analysis are described. In an embodiment, a method comprises determining desirable features of the video content values, determining undesirable features of the video content values, constructing a quality model using the desirable features and the undesirable features, and storing the quality model in a memory module. Other embodiments are also described.

12 Claims, 6 Drawing Sheets

300

NO-REFERENCE VIDEO QUALITY MODEL

BACKGROUND

Computer graphics performance has become and integral part of computer system performance. Video quality models may be used to measure or quantify characteristics of video or graphics and to apply correction routines to video or graphic content. Objective video quality models may find utility in computer graphics applications and in the development of computer graphics devices.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

Some of the embodiments discussed herein may be utilized to generate a no-reference video quality model, which may be implemented in conjunction with integrated graphics logic. In an embodiment, the graphics logic may be provided on an integrated circuit (IC) device. The graphics logic may have access to data stored in an external graphics memory module. Hence, the graphics logic may have access to memory bandwidth provided through the graphics memory module, in addition to or instead of access to a system memory that may be shared between various components of a computing system, such as the computing systems discussed with reference to FIG. 1, 2, or 4.

Figure 1:
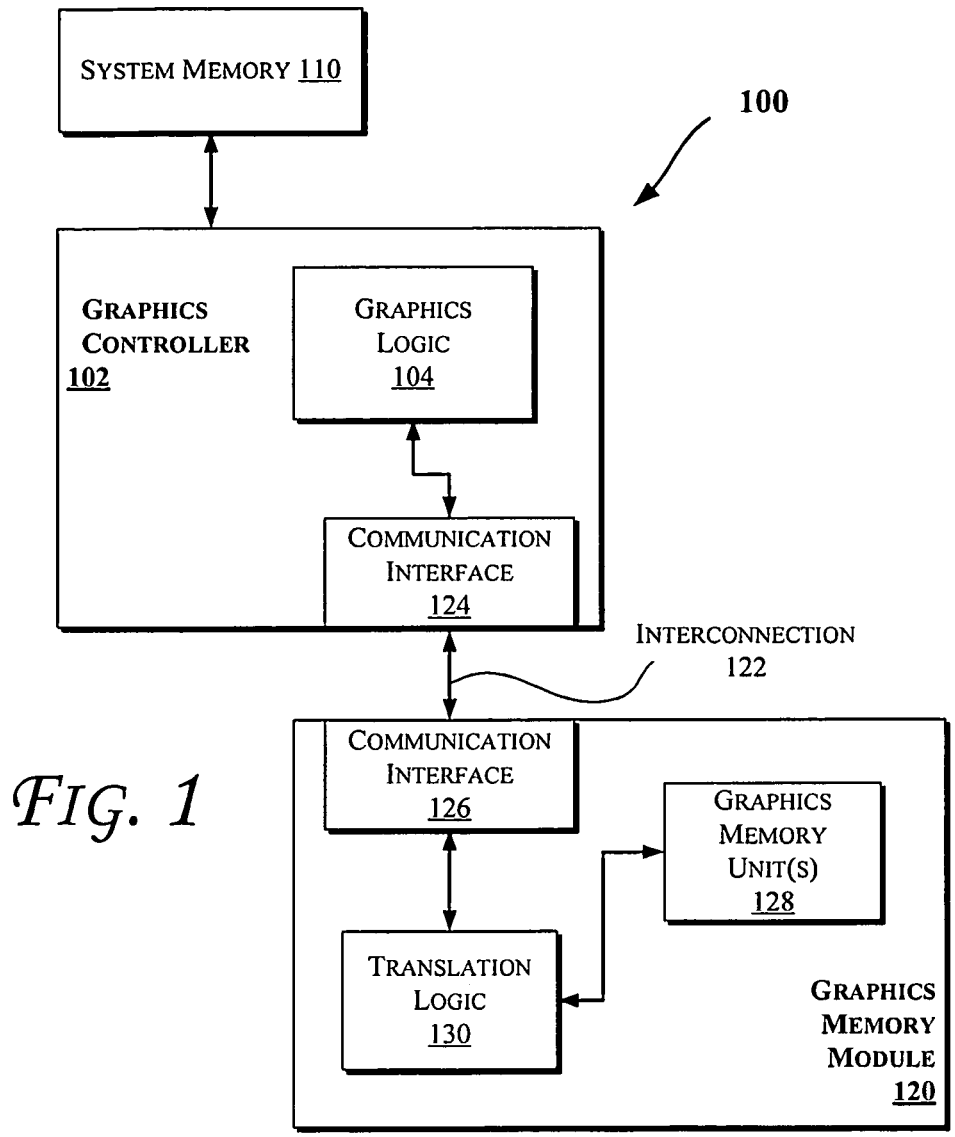
FIGS. 1, 2, and 4 illustrate block diagrams of embodiments of computing systems, which may be utilized to implement various embodiments discussed herein.

More particularly, FIG. 1 illustrates a block diagram of a computing system 100 in accordance with an embodiment of the invention. The computing system 100 may include a graphics controller 102 which may include a graphics logic 104 to access and/or process data stored in one or more of: a system memory 110 and/or one or more external graphics memory module(s) 120. In one embodiment, the graphics controller 102 may be provided on an IC device. In some embodiments, the IC device may be coupled to a motherboard of a computing device (such as a desktop computer, a portable computer, a personal digital assistance, a smart phone, etc.), for example, through a socket (such as a zero insertion force (ZIF) socket) and/or a soldered connection. In an embodiment, the system memory 110 may be accessible by other components of a computing system (such as one or more processor cores discussed with reference to FIG. 2). Moreover, the memory 110 may include bulk dynamic random access memory (DRAM) chips or units, which may simultaneously support two separate channels of double data rate (DDR) DRAM devices. Alternatively, additional channels of memory may be utilized to improve performance.

As shown in FIG. 1, an interconnection 122 may provide one or more communication channels between the graphics controller 102 (and hence the graphics logic 104) through communication interfaces 124 and 126. As discussed herein, the usage of "bus," "interconnection," or "interconnection network" may be interchangeable. Moreover, the interfaces 124 and 126 may communicate via various communication protocols such peripheral component interconnect (PCI) (e.g., which may comply with PCI Local Bus Specification, Revision 3.0, March 2004), PCI-X (e.g., which may comply with PCI-X Specification Rev. 2.0a, April 2003), or PCI express (PCIe) (e.g., which may operate in accordance with PCIe Specification, Revision 2.0, October 2006). In an embodiment, the communication interface 124 may be a PCIe graphics (PEG) port.

Additionally, the module 120 may include one or more graphics memory unit(s) 128 (generally referred to here as graphics "memory units" or more generally graphics "memory unit"), such as one or more units of graphics DDR (GDDR), DDR DRAM, etc. In some embodiments, the memory units used for the graphics memory module 120 may be faster (e.g., operating at a higher frequency), include less capacity, and/or provide a wider data path access when compared with the memory units used for the system memory 110. In an embodiment, graphics performance may be enhanced because the graphics logic 104 may have access to the graphics memory module through a dedicated interconnection or alternatively an interconnection which is shared amongst relatively less devices than the system memory 110. Also, the memory devices discussed herein (e.g., with respect to the system memory 110 and/or the memory module 120) may include various types of memory units in various embodiments, such as dual in-line memory modules (DIMMs) or small outline DIMMs (SO-DIMMs).

Furthermore, the system 100 may include a translation logic 130 to translate data communicated between the communication interfaces 124 and 126 between a first format (e.g., that may be used by the graphics logic 104) and a second format (e.g., that may be used by the graphics memory unit(s) 128). In some embodiments, the translation logic 130 may translate between proprietary low-level protocols, such as low level xDDR commands including a "pre-charge" command, an "open page" command, etc. Accordingly, the logic 130 may enable the graphics logic 104 to utilize any type of graphics memory unit(s) 128. Alternatively, the logic 130 may be located elsewhere in components of the system 100 (such as within the graphics controller 102) in some embodiments.

Figure 2:
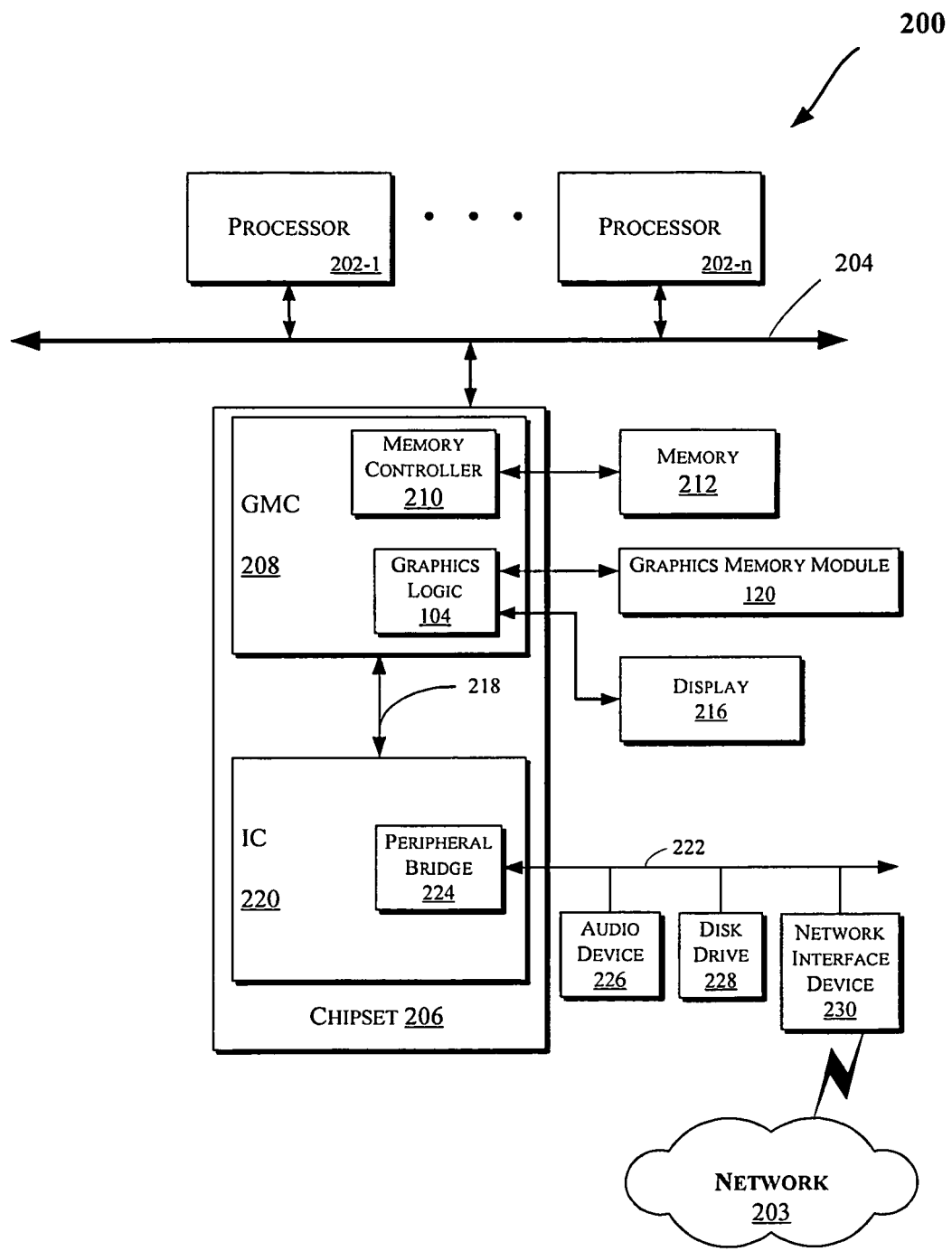

FIG. 2 illustrates a block diagram of a computing system 200 in accordance with embodiments. The computing system 200 may include one or more central processing unit(s) (CPUs) 202 or processors that communicate via an interconnection network (or bus) 204. The processors 202 may include a general purpose processor, a network processor (that processes data communicated over a computer network 203), or other types of a processor (including a reduced instruction set computer (RISC) processor or a complex instruction set computer (CISC)). Moreover, the processors 202 may have a single or multiple core design. The processors 202 with a multiple core design may integrate different types of processor cores on the same integrated circuit (IC) die. Also, the processors 202 with a multiple core design may be implemented as symmetrical or asymmetrical multiprocessors. Further, the operations discussed with reference to FIG. 1, 3, or 4 may be performed by one or more components of the system 200.

A chipset 206 may also communicate with the interconnection network 204. The chipset 206 may include a graphics memory controller (GMC) 208. The GMC 208 may include a memory controller 210 that communicates with a memory 212 (which may be the same or similar to the memory 110 of FIG. 1). The memory 212 may store data, including sequences of instructions, that may be executed by the CPU 202, or any other device included in the computing system 200. In an embodiment, the memory 212 may be the same or similar to the memory 110 of FIG. 1. In one embodiment of the invention, the memory 212 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 204, such as multiple CPUs and/or multiple system memories.

The GMC 208 may also include the graphics logic 104 that communicates with a display device 216. In one embodiment of the invention, the graphics logic 104 may communicate with the display device 216 via an accelerated graphics port (AGP) and/or a PEG port. In an embodiment of the invention, the display 216 (such as a flat panel display) may communicate with the graphics logic 104 through, for example, a signal converter (not shown) that translates a digital representation of an image stored in a storage device such as video memory (e.g., the module 120) or system memory (e.g., memory 212) into display signals that are interpreted and displayed by the display 216. Moreover, in some embodiments that utilize a PEG port, one or more of the PEG port pins may be used to drive the display device 216 while one or more other pins of the PEG port may be used to access the graphics memory module 120. The display signals produced by the display device may pass through various devices before being interpreted by and subsequently displayed on the display 216.

An interface 218 may allow the GMC 208 and an input/output controller (IC) 220 to communicate. The IC 220 may provide an interface to I/O device(s) that communicate with the computing system 200. The IC 220 may communicate with a bus 222 through a peripheral bridge (or controller) 224, such as a peripheral component interconnect (PCI) bridge, a universal serial bus (USB) controller, or other types of peripheral bridges or controllers. The bridge 224 may provide a data path between the CPU 202 and peripheral devices. Other types of topologies may be utilized. Also, multiple buses may communicate with the IC 220, e.g., through multiple bridges or controllers. Moreover, other peripherals in communication with the IC 220 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 222 may communicate with an audio device 226, one or more disk drive(s) 228, and a network interface device 230 (which is in communication with the computer network 203). Other devices may communicate via the bus 222. Also, various components (such as the network interface device 230) may communicate with the GMC 208 in some embodiments of the invention. In addition, the processor 202 and the GMC 208 may be combined to form a single chip. Furthermore, a graphics accelerator may be included within the GMC 208 in other embodiments of the invention.

Furthermore, the computing system 200 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 228), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 3:
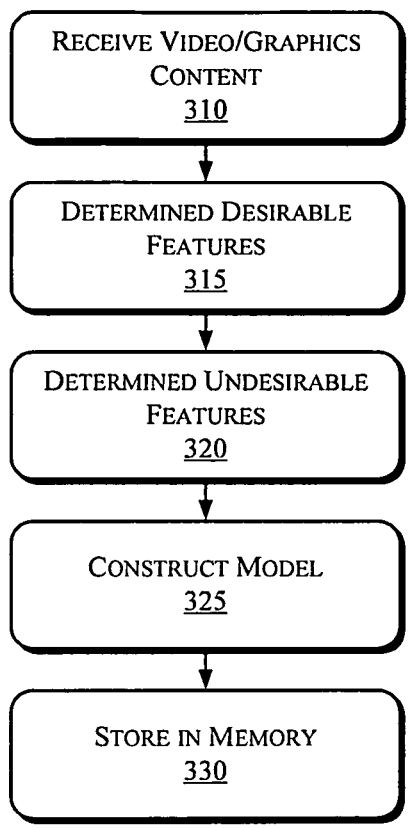
FIG. 3 illustrates a flow diagram of a method in accordance with an embodiment.

FIG. 3 illustrates a flow diagram of a method 300 to implement a video quality model, according to an embodiment. In some embodiments, various components discussed with reference to FIGS. 1-2 and 4 may be utilized to perform one or more of the operations discussed with reference to FIG. 3. In one embodiment the system computes objective video quality using a set of measurements of desirable and undesirable features of an image. The model accounts for perceptual effects of desirable and undesirable image features as well as various perceptual interactions among those features.

Referring to FIGS. 1-3, at an operation 310, video (and/or graphics) content is received, e.g., in the graphics controller 102. At operation 315 one or more desirable features associated with the received video or graphics content are determined, and at operation 320 one or more undesirable features associated with the video or graphics content are determined. Examples of the desirable (higher values result in higher quality) features are sharpness (S), contrast (C). Examples of the undesirable (higher values result in lower quality) features are blockiness (B), ringing (R), and noise (N). In some embodiments, metrics for the features may be normalized to a range of 0-100 and correlated to a high extent with perceived strength of the features. In rank ordering experiments, the monotonic behavior or the metrics (when each is taken as the single independent variable) is required.

Figure 5:
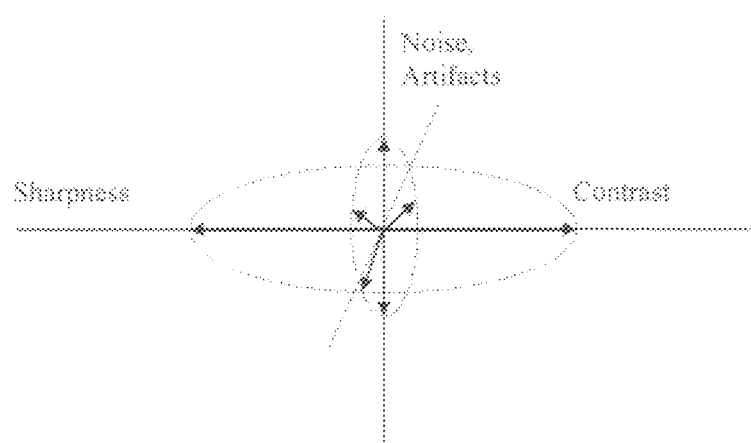
FIGS. 5-7 illustrate aspects of a video quality model in accordance with embodiments.

In some embodiments, the quality model comprises two orthogonal dimensions that correspond to desirable and undesirable features. As seen in FIG. 5, the horizontal plane maps the desirable features of sharpness and contrast. These are shown in opposite directions to indicate that quality depends on a balance between them, and that the total contribution is not a linear sum but rather a combination of them that takes into account a masking effect (i.e., that contrast affects perceived sharpness and vice-versa).

The transverse plane maps undesirable features such as analog (transmission related) and digital (compression related) noise, blur, etc. Combined effects are typically of the masking type (e.g. blockiness and ringing, blockiness and noise). Masking is modeling by using weights proportional to the magnitude of the feature such that they emphasize the influence of the relatively strongest artifact(s) and de-emphasize the relatively weaker artifact(s).

Figure 6:
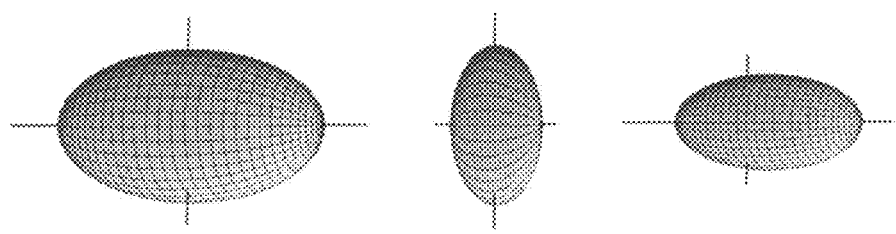

The 3D shape generated by the two feature planes is a prolate spheroid, as shown in FIG. 6. In a graphical depiction, good quality images are centered along the horizontal axis, and have a small cross section on the vertical plane. By contrast, in bad images the horizontal axis would be short, and/or the spheroid would be off-center. The larger horizontal dimension indicates that the relative influence of the desirable features is much stronger than that of the undesirable features Using the above principles a single metric that combines the feature values into a single quality figure may be obtained.

The overall quality (OQ) can be computed as the following combination of desirable and undesirable features:

$$OQ = K1*DF - K2*UF$$

The weights K1 and K2 represent the relative importance of desirable (DF) and undesirable (UF) features. The ratio K1/K2 has been found to be 3 for the metrics used. The actual values also depend on the desired quality scale; for a scale of 0-5 we have found K1=6, and K2=2.

Naming the desirable features as: C=contrast, and S=sharpness The DF part of the model is computed using the following empirical formula:

$$DF = \left\{ \left(\frac{C}{100}\right) * \left(1 - \frac{S}{120}\right) * \left(1 - \frac{|C-S|}{80}\right) + \right.$$
$$\left. \left(\frac{S}{100}\right) * \left(1 - \frac{C}{120}\right) * \left(1 - \frac{|C-S|}{80}\right) \right\} 0.15 + \text{Contrast \& Sharpness}$$
$$\frac{\left\{1 + \sin\left(\left(2*PI*\frac{S}{100}\right) - \frac{PI}{2}\right)\right\}}{15} \quad \text{Sharpness peak}$$

The three terms account for:

Contrast weighted by the complement of sharpness (~(1−S)) and the complement of the difference in sharpness and contrast (~(1−‖C−S‖), balance effect).

Sharpness weighted by the complement of contrast (~(1−C)) and the complement of the difference in sharpness and contrast (~(1−‖C−S‖), balance effect).

Emphasize high response to a certain sharpness value, a perceptual sharpness peak.

In good images, sharpness and contrast are high and highly correlated, thus the Contrast and Sharpness are modeled by the first two symmetric terms that include the mutual masking effect (terms 1−[S‖C]/120) and a penalty for the difference or unbalance effect (term 1−‖S−C‖/80). All constant values including the power of 0.15 represent a best fit to predict subjective scores taken from a large, representative set of video sequences (obtained in a separate experiment).

Figure 7:
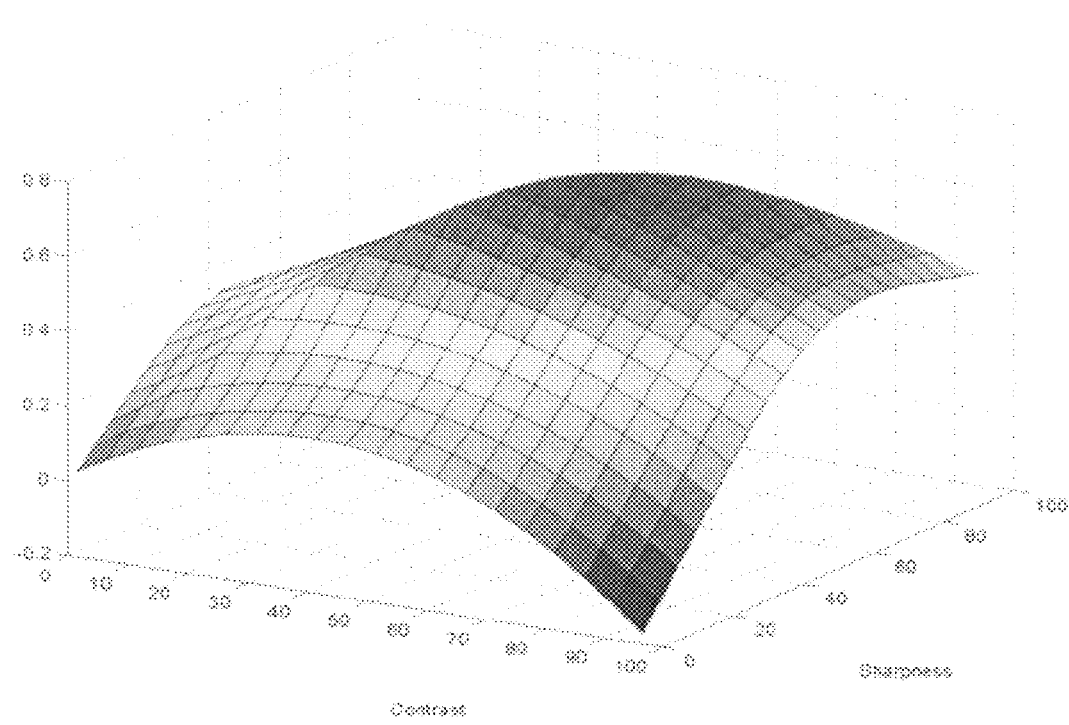

The DF equation has the desired effect on the prolate spheroid, i.e. the ellipse on the horizontal plane will shift off center for low quality due to lack of balance S−C, and it will have a maximum corresponding to the perceptual sharpness peak. The surface plot of the DF part of the model is shown in FIG. 7. FIG. 7 illustrates that quality increases with sharpness and contrast, with is a maximum value around the mid-range of sharpness. Beyond the maximum, quality drops as sharpness increases lead to over-sharpening which makes content look unnatural or artifactual.

The third term models the quality peak at the mid-range sharpness (the shifted sine function is just one of a number of choices for this purpose). The model combines three undesirable features (UF): B=blockiness, R=ringing, and N=noise In some embodiments, the UF part of the model is computed using the following formula:

| | |
|---|---|
| UF = {B*R>5.5 ‖ (R>0 && B*R<5.5 && S > 85) ? | Condition to avoid false B positives and to account for low blockiness under high sharpness. |
| Log(1+B/2) * (1−R/200) * (1−N/200) ,0} | Blockiness term masked by ringing and noise [1.7 max] |
| + (R/60)*(1−N/200)*(1−B/200) | Ringing term masked by noise and blockiness [1.66 max] |
| + (B*R<10 AND R < 7 ? (R/10)$^{0.33}$ ,0} | Low R, non-MPEG [0.9 max] |
| + (Log(N)/1.5) * (1−R/100) | Noise term 1, masked by ringing [1.33 max] |
| + (N/100)$^5$ | Noise term 2, for high noise, unmasked [1.0 max] |
| + Exp(−S*0.06) * (1+Exp(−C*0.06)) | Blur facilitated by low C-up to x2[2.0 max] |

The formula consists of 6 terms, i.e. one blockiness term, two ringing terms, two noise terms, and one blur term (i.e. reflecting the effect of low sharpness becoming an undesirable feature). The upper bounds indicate the relative influence of the undesirable features. From strong to weak, the following factors influence ranking: noise, blur, blockiness, and ringing.

One can easily recognize terms of the form f(a)*(1−f(b) which reflect the contribution of a masked by b. Monotonic functions (e.g. Exp and power) are used for curve fitting. Conditional terms deal with possible imperfections of the feature metrics so that the range in which the metric is well behaved (i.e. low error region) is mainly used. Each of the terms in the UF equation is described next.

The blockiness term Log(1+B/2)*(1−R/200)*(1−N/200) uses a logarithmic function of B, masked by ringing and noise. The logarithmic increase in the contribution of blockiness is shifted down by the level of ringing and noise.

The ringing term (R/60)*(1−N/200)*(1−B/200) is very similar to the blockiness term except that it is linear instead of logarithmic. The secondary ringing term (R/10)0.33 uses a power function. The term applies if the conditions (B*R<10) AND (R<7) is true; i.e. low ringing and low blockiness. In practice this accounts for low ringing effects which are noticeable for low compression and other images affected by ringing (e.g. over-enhanced images). The combined ringing terms can be modeled such that there is a peak of about 0.9 in the low ringing (at low blockiness) range, and then the linear term with the blockiness masking taking over the rest of the range.

The noise term (Log(N)/1.5)*(1−R/100)+(N/100)5 is a mix of a logarithmic part which is masked by ringing, and a power law part which is not masked.

The blur term Exp(−S*0.06)*(1+Exp(−C*0.06)) includes an exponential decay function of the sharpness, facilitated by a similar function of the contrast. This captures the fact that low sharpness is blur which is facilitated by low contrast.

Using a set of 164 sequences derived from 6 original sequences treated to produce variations in compression noise (blockiness, ringin), analog noise, sharpness/blur, and contrast, model parameters were derived that give a Pearson correlation coefficient of 0.835 with the subjective quality scores (mean opinion scores) obtained in a separate experiment. The model can be generalized to n features as the perceptual quality space cannot necessarily be mapped to a 3D space.

Once the desirable and undesirable features are determined, the quality model may be used to assign quality ratings to video content, which ratings may be stored in a memory module such as the graphics memory unit(s) 128. Further, the quality ratings may be used to correct video content through post-processing algorithms in which the control signal is the overall quality metric or any of the submetrics, and may be used in the design of video devices or circuitry which will be able to comply with a prescribed video quality level.

Figure 4:
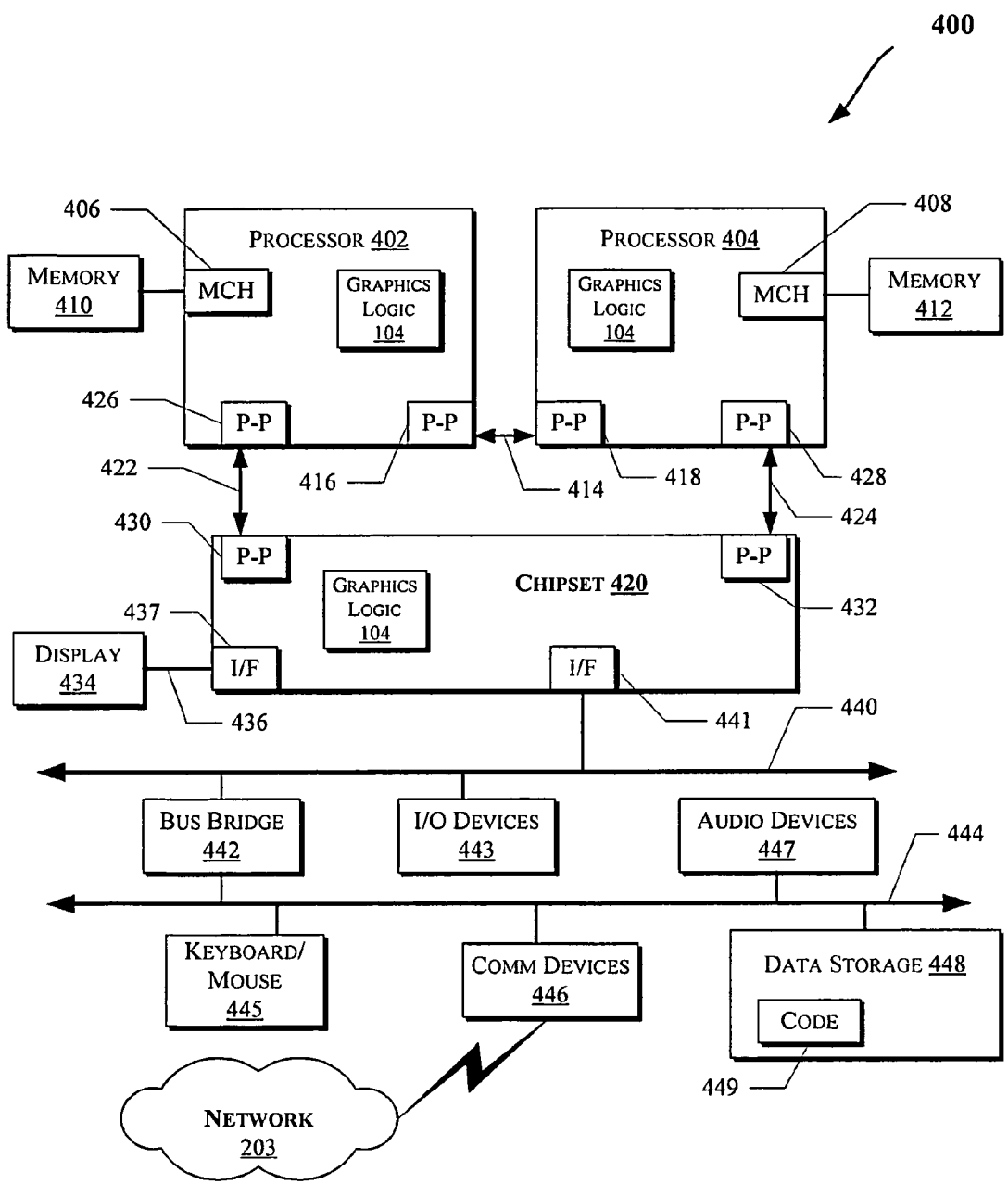

FIG. 4 illustrates a computing system 400 that is arranged in a point-to-point (PtP) configuration, according to an embodiment of the invention. In particular, FIG. 4 shows a system where processors, memory, and input/output devices are interconnected by a number of point-to-point interfaces. The operations discussed with reference to FIGS. 1-3 may be performed by one or more components of the system 400.

As illustrated in FIG. 4, the system 400 may include several processors, of which only two, processors 402 and 404 are shown for clarity. The processors 402 and 404 may each include a local memory controller (MC) 406 and 408 to enable communication with memories 410 and 412. The memories 410 and/or 412 may store various data such as those discussed with reference to the memory 212 of FIG. 2.

In an embodiment, the processors 402 and 404 may be one of the processors 202 discussed with reference to FIG. 2. The processors 402 and 404 may exchange data via a point-to-point (PtP) interface 414 using PtP interface circuits 416 and 418, respectively. Also, the processors 402 and 404 may each exchange data with a chipset 420 via individual PtP interfaces 422 and 424 using point-to-point interface circuits 426, 428, 430, and 432. The chipset 420 may further exchange data with a graphics circuit 434 via a graphics interface 436, e.g., using a PtP interface circuit 437.

At least one embodiment of the invention may be provided within the processors 402 and 404. For example, the graphics logic 104 of FIG. 1 may be located within one or more of the processors 402 and 404. Other embodiments of the invention, however, may exist in other circuits, logic units, or devices within the system 400 of FIG. 4. For example, the graphics logic 104 may be located within the chipset 420, in addition to or instead of one or more of the processors 402 and 404. Also, the graphics logics 104 may be in communication with one or more graphics memory modules (not shown, which may be the same or similar to the module 120 of FIGS. 1-2), e.g., via a point-to-point interface. Furthermore, other embodiments of the invention may be distributed throughout several circuits, logic units, or devices illustrated in FIG. 4.

The chipset 420 may communicate with a bus 440 using a PtP interface circuit 441. The bus 440 may communicate with one or more devices, such as a bus bridge 442 and I/O devices 443. Via a bus 444, the bus bridge 442 may communicate with other devices such as a keyboard/mouse 445, communication devices 446 (such as modems, network interface devices, or other communication devices that may communicate with the computer network 203), audio I/O device 447, and/or a data storage device 448. The data storage device 448 may store code 449 that may be executed by the processors 402 and/or 404.

In various embodiments of the invention, the operations discussed herein, e.g., with reference to FIGS. 1-4, may be implemented as hardware (e.g., logic circuitry), software, firmware, or combinations thereof, which may be provided as a computer program product, e.g., including a machine-readable or computer-readable medium having stored thereon instructions (or software procedures) used to program a computer to perform a process discussed herein. The machine-readable medium may include a storage device such as those discussed with respect to FIGS. 1-4.

Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a bus, a modem, or a network connection). Accordingly, herein, a carrier wave shall be regarded as comprising a machine-readable medium.

Reference in the specification to "one embodiment," "an embodiment," or "some embodiments" means that a particular feature, structure, or characteristic described in connection with the embodiment(s) may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A method to assess quality of video content, comprising:
determining desirable features of the video content;
determining undesirable features of the video content;
generating a three-dimensional representation of quality factors of the video content, wherein the three-dimensional representation is modeled as a prolate spheroid which maps desirable features in a first dimension and undesirable features in a second dimension orthogonal to the first dimension;
constructing a quality model using the desirable features and the undesirable features, wherein the quality model alters at least one of a shape or a center of the prolate spheroid;
determining a single quality metric from the quality model; and
storing the single quality metric in a memory module.

2. The method of claim 1, wherein the quality model comprises a weighted combination of a first factor derived from desirable features and a second factor derived from undesirable features.

3. The method of claim 2, wherein the first factor comprises:
a measure of contrast weighted by a complement of sharpness of an image;
a measure of sharpness weighted by a complement of contrast of an image; and
a sharpness peak.

4. The method of claim 2, wherein the second factor comprises:
a measure of blockiness under high sharpness;
a measure of blockiness masked by ringing and noise;
a ringing term masked by noise and blockiness;
a noise term masked by ringing;
an unmasked noise term; and
a blur term.

5. The method of claim 1, further comprising using the single quality metric to correct video content through post-processing algorithms.

6. The method of claim 1, further comprising using the single quality metric to assess a design of a video device.

7. A system to assess quality of video content, comprising:
   logic to determine desirable features of the video content values;
   logic to determine undesirable features of the video content values;
   logic to generate a three-dimensional representation of quality factors of the video content, wherein the three-dimensional representation is modeled as a prolate spheroid which maps desirable features in a first dimension and undesirable features in a second dimension orthogonal to the first dimension;
   logic to construct a quality model using the desirable features and the undesirable features, wherein the quality model alters at least one of a shape or a center of the prolate spheroid;
   logic to determine a single quality metric from the quality model; and
   logic to store the single quality metric in a memory module.

8. The system of claim 7, wherein the quality model comprises a weighted combination of a first factor derived from desirable features and a second factor derived from undesirable features.

9. The system of claim 8, wherein the first factor comprises:
   a measure of contrast weighted by a complement of sharpness of an image;
   a measure of sharpness weighted by a complement of contrast of an image; and
   a sharpness peak.

10. The system of claim 7, wherein the second factor comprises:
    a measure of blockiness under high sharpness;
    a measure of blockiness masked by ringing and noise;
    a ringing term masked by noise and blockiness;
    a noise term masked by ringing;
    an unmasked noise term; and
    a blur term.

11. The system of claim 10, further comprising using the single quality metric to correct video content through post-processing algorithms.

12. The system of claim 7, further comprising logic to use the single quality metric
    to assess a design of a video device.

* * * * *